UNITED STATES PATENT OFFICE 2,480,088

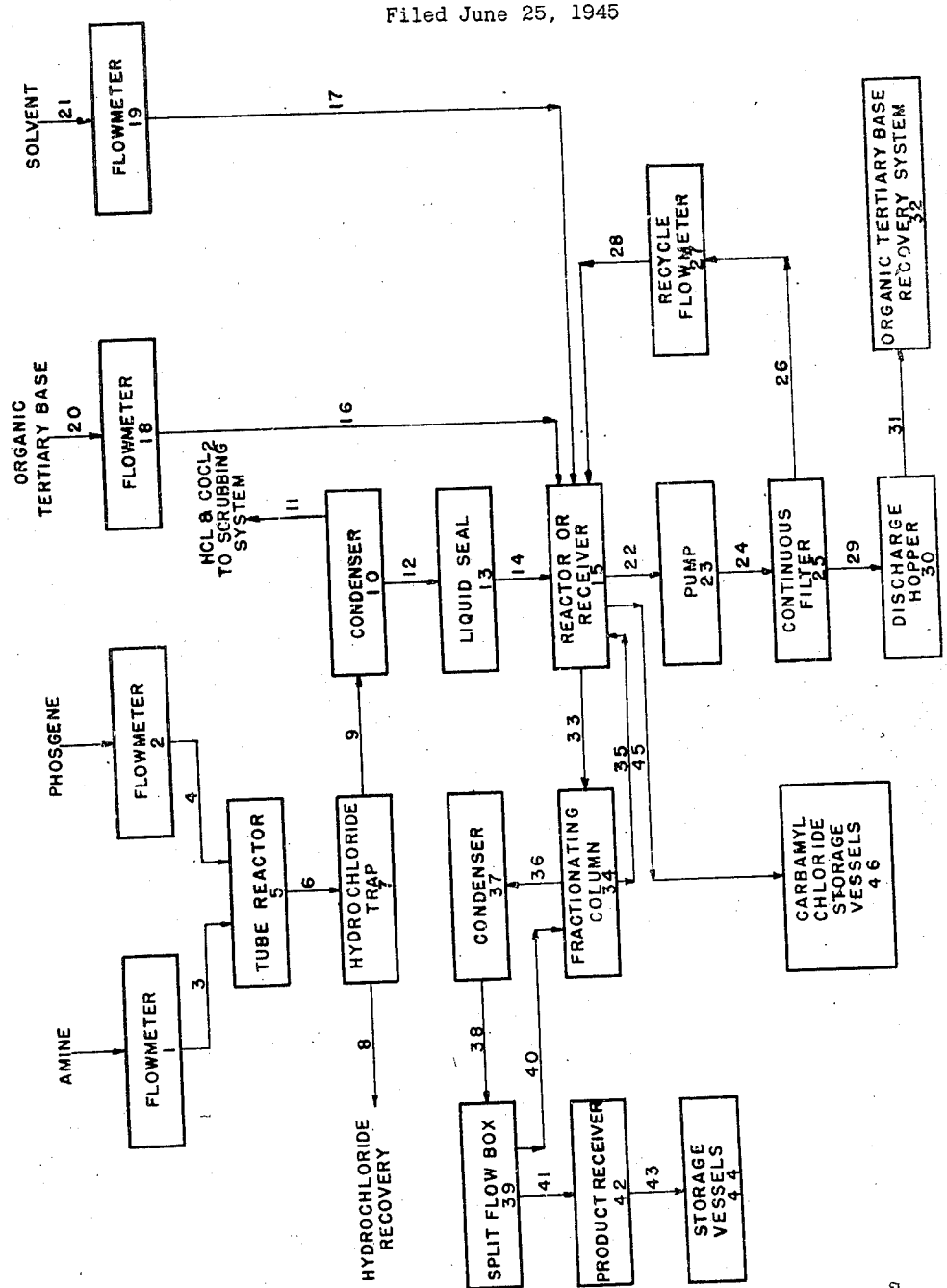

PROCESS OF PRODUCING CARBAMYL CHLORIDES

Robert J. Slocombe and Edgar E. Hardy, Anniston, Ala., assignors to Monsanto Chemical Company, St. Louis, Mo., a corporation of Delaware Application June 25, 1945, Serial No. 601,372

18 Claims. (Cl. 260—544)

This invention relates to carbamyl chlorides and isocyanic acid esters and to an improved process for producing same.

An object of the invention is to provide an economical and commercially feasible process for making primary and secondary carbamyl chlorides and isocyanic acid esters in a high state of purity and in substantially quantitative yields.

An additional object is to provide a process for making primary and secondary carbamyl chlorides and isocyanic acid esters wherein an amine and phosgene are intimately mixed and reacted together in the vapor phase, thus insuring a substantially instantaneous and complete reaction and obviating the necessity for using a very large excess of phosgene in order to expedite the reaction and to avoid the formation of by-products which materially reduce the yield of the desired product.

A further object is to provide a process for producing carbamyl chlorides and isocyanic acid esters wherein a primary or a secondary amine and phosgene are reacted together in the vapor phase, thereby making possible an efficient proportioning, mixing and contacting of the reactants with the result that the reaction can be effectively controlled and carried out in a continuous manner.

A still further object is to provide a vapor phase process for producing the above compounds in which the primary and secondary carbamyl chlorides are rapidly removed from the reaction zone in order to prevent the development of side reactions which are responsible for the relatively low product yields of prior methods employing a multiple phase reaction.

Another object is to provide a process for producing isocyanic acid esters which comprises reacting a primary amine with phosgene followed by dehydrochlorination of the resulting primary carbamyl chloride.

Other objects and advantages of the present invention will be apparent to those skilled in the art as the description proceeds.

Heretofore carbamyl chlorides and isocyanic acid esters have been prepared by reacting primary and secondary amines or the corresponding hydrochlorides with phosgene or a compound which develops phosgene under the reactive conditions of the process. These reactions have been carried out by passing phosgene over the molten hydrochloride salt or by reacting phosgene or a compound liberating phosgene with an amine or an amine hydrochloride which is dissolved or suspended in an inert organic solvent. The foregoing methods, however, have a number of disadvantages which impair or discourage their use on an industrial scale.

One disadvantage is that they both involve a multiple phase reaction which precludes an efficient proportioning, mixing and contacting of the reagents with result that during the initial stages of the reaction the concentration of the amine is too high in some portions of the reaction mixture whereas it is too low in others during the final stages of the reaction. This leads to an incomplete reaction between the amine and the phosgene and also to the development of side reactions which produce substituted ureas and other undesirable by-products. These side reactions have the undesirable effect of materially reducing the yield of the desired product and at the same time create a difficult and tedious purification problem.

Another disadvantage is that the reaction products are not immediately removed from the reaction zone with the result that by the time substantially all of the amine has reacted with the phosgene, the previously formed products have either partially decomposed or entered into side reactions which further reduce the yield of the desired product.

A further disadvantage is that in order to carry out the processes with any degree of efficiency, it is generally necessary to employ high pressure equipment and also a very large excess of phosgene. However, even under these conditions the reaction takes place at a very slow rate and due to the necessity for using such large quantities of this toxic gas, the practice of the above processes is an exceedingly hazardous operation.

Now we have developed a relatively simple, commercially feasible process for making carbamyl chlorides and isocyanic acid esters which has none of the objectionable features enumerated above. This process involves reacting phosgene with a primary or secondary amine while in the vapor phase to form a monosubstituted or a disubstituted carbamyl chloride. If the corresponding isocyanate is desired, then the monosubstituted carbamyl chloride is subjected to dehydrochlorination by means of heat, a tertiary organic base or another suitable compound.

For a more complete understanding of our improved vapor phase method of producing carbamyl chlorides and isocyanic acid esters, reference is made to the following specific examples.

EXAMPLE I

Monomethyl carbamyl chloride and methyl isocyanate

The apparatus employed in this embodiment of the present invention included phosgene and methyl amine flow meters, a reactor, a methyl amine hydrochloride trap, a water-cooled methyl carbamyl chloride condenser, a reactor-receiver, a fractionator, a methyl isocyanate condenser, and a receiver for collecting the methyl isocyanate.

The reactor consisted of an electrically heated Pyrex tube which was two inches in diameter and 6 feet in length. This reactor tube was equipped with three thermocouples which were situated between the glass wall and the asbestos layer carrying the heating wire. One thermocouple was located on each end of the reactor tube and another at the center which controlled the heating of the tube.

The upper end of the reactor tube was provided with a gas mixer which extended about 5 inches into the tube. The discharge end thereof was connected to a hydrochloride trap by means of an electrically heated 1" glass tube provided with a thermocouple for recording the temperature of the gases leaving the tube.

The trap consisted of a 2 liter round bottom flask which served to collect small amounts of condensed methyl amine hydrochloride. This trap, which was electrically heated to prevent condensation of the carbamyl chloride, was connected directly to a methyl carbamyl chloride condenser which took the form of a series of three jacketed pipes, each of which was 1 inch in diameter and 4 feet in length. Warm water, automatically maintained at the desired temperature by means of a double-walled heat exchanger, was circulated through the condenser jackets.

The condenser was connected to a Pfaudler glass lined jacketed reactor which was provided with a stirrer, a venting tube for exhausting waste gases, a lead inlet pipe for introducing toluene and pyridine, a vapor outlet pipe leading to a fractionator, a return pipe for returning reflux from the fractionator to the reactor and a bottom outlet pipe for discharging the toluene-pyridine hydrochloride mixture. This reactor served as a receiver for the condenser methyl carbamyl chloride and as a reactor and still for converting the intermediate into isocyanate and for removing the latter from the reaction mixture by distillation. When employed as a receiver, it was water-cooled and when used as a still it was heated by means of steam.

The fractionator referred to above consisted of a lead lined still column which was 4 inches in diameter and 6 feet in length. It was packed with ¼" stoneware Raschig rings and was provided with a 2" lead vapor line leading to the top of an isocyanate condenser consisting of an ice-water sprayed 2" lead coil situated in a steel tank.

This condenser was provided with a 1" lead pipe for returning the reflux to a point near the top of the still column, and also with an outlet pipe for discharging the condensed methyl isocyanate into an ice-water cooled Pfaudler glass lined jacketed receiver. The receiver was equipped with an outlet pipe through which the isocyanate was drained into suitable glass storage vessels.

Description of process

Phosgene and methyl amine were charged into the above reactor for 7.5 hours at flow rates which were adjusted so as to supply 1.5 moles of phosgene per mole of methyl amine. During the reaction which involved a total consumption of 19.5 lbs. of methyl amine, the reactor tube was heated in such a manner that the exit gases were maintained at a temperature of from 265° C. to 275° C.

The gaseous reaction products were conducted from the reactor into the electrically heated hydrochloride trap and then into the methyl carbamyl chloride condenser which was operated at a temperature between 45° and 50° C. The methyl carbamyl chloride which separated from the gaseous reaction products by condensation was collected in the reactor-receiver.

79 lbs. each of toluene and pyridine were successively introduced into the reactor-receiver, the pyridine being added slowly while the reaction mixture was agitated and cooled with water. After all the pyridine had been added, the cooling water was drained from the reactor jacket and steam introduced slowly until the methyl isocyanate formed had been distilled. During the distillation, a column head temperature of from 37° to 40° C. was maintained. A total of 29 lbs. of methyl isocyanate was obtained which represented a product yield of 81% of theory, basis methyl amine.

EXAMPLE II

Secondary butyl carbamyl chloride and secondary butyl isocyanate

The apparatus used in this embodiment of the invention included a vertically mounted and electrically heated glass reactor tube which had a length of 54.5 inches, a cross sectional area of 0.62 square centimeter and total volume of 87 cubic centimeters. The reactor was equipped at the top with an inlet tube for introducing phosgene and a second inlet tube for feeding the amine into the reactor. The former tube was provided with a capillary tip through which phosgene could be introduced at a high velocity and it was so arranged with respect to the amine inlet tube that efficient mixing of the two gaseous reactants was insured.

The bottom of the reactor tube was equipped with a water-cooled condenser which was attached to the inlet tube of a three-necked flask. The flask served as a receiver for the secondary butyl carbamyl chloride and as a reactor for converting this compound into the corresponding isocyanate. A water-cooled condenser was also connected to the outlet tube of the flask which prevented loss of the carbamyl chloride by evaporation.

The apparatus also included a flash boiler for vaporizing the amine, flow meters for controlling the flow of phosgene and the vaporized amine, and also wash bottles containing sulfuric acid and an aqueous solution of sodium hydroxide for removing moisture from the phosgene and amine respectively.

Description of process 100 c.c. of secondary butyl amine was vaporized in the flash boiler and charged into the above described reactor tube where it was mixed and reacted with phosgene in the molecular proportion of one mole of the amine to 1.5 moles of phosgene. During the reaction the temperature of the reactor was controlled so that the exit gases had a temperature of about 245° C. These hot gases were passed through the water-cooled condenser (condenser temperature about 20° C.) and 144 grams of secondary butyl carbamyl chloride was recovered in the three-necked flask receiver.

The three-necked flask receiver was thereupon disconnected and equipped with a stirrer, a fractionating column, and a dropping funnel.

193 grams of dimethyl aniline was introduced into the receiver containing the secondary butyl carbamyl chloride and the resulting mixture was fractionally distilled. A product boiling at 101° C. to 104° C. was collected. This product was redistilled to yield 70 grams of secondary butyl isocyanate which had a boiling range of from 99° C. to 101° C.

EXAMPLE III

Isobutyl carbamyl chloride and isobutyl isocyanate 100 c. c. of vaporized isobutyl amine was introduced into the electrically heated reactor tube described in Example II where it was reacted with phosgene in the molecular ratio of 1.5 moles of phosgene per mole of amine. During this reaction the temperature in the reactor was regulated so that the exit gases had a temperature of about 250° C. These hot gases were treated in the manner described in Example II and 157 grams of isobutyl carbamyl chloride was collected.

211 grams of dimethyl aniline was mixed with the isobutyl carbamyl chloride and the mixture fractionally distilled. This yielded 78 grams of isobutyl isocyanate having a boiling range of from 100° C. to 103° C.

EXAMPLE IV

Allyl carbamyl chloride and allyl isocyanate 100 c. c. of allyl amine was fed at the rate of about 1.6 g./min. into a flash boiler heated to a temperature of 140° C. The vaporized amine was led into the electrically heated reactor tube described in Example II where it was reacted with phosgene which was being charged at the rate of 900 c. c. per minute. During the reaction, the reactor was heated to a temperature sufficient to maintain the exit gases at about 250° C. 161 grams of allyl carbamyl chloride was recovered by condensation from these hot gases.

245 grams of dimethyl aniline was added to the allyl carbamyl chloride and the resulting mixture was fractionally distilled to yield 83 grams of allyl isocyanate having a boiling range of 83.5° C. to 85° C. This represented a yield of 75.4% of theory, basis allyl amine.

EXAMPLE V

Phenyl carbamyl chloride and phenyl isocyanate

The apparatus used in carrying out the following embodiment of the present invention was similar to that described in Example II except that the reactor tube was mounted in a substantially horizontal position and was provided with an air-cooled condenser which in turn was connected to an electrostatic precipitator. The precipitator which acted as a condenser was provided at the discharge end with a phenyl carbamyl chloride receiver and also with an outlet tube for exhausting the off-gases.

Description of process 50 grams of aniline was charged at the rate of one drop (0.0095 grams or 0.000102 mole per drop) per second into the flash boiler which was heated to a temperature of 295° C. The aniline vaporized in the flash boiler was fed into the electrically heated reactor tube where it was intimately mixed and reacted with phosgene which was introduced into the reactor at the rate of 0.00041 mole (750 c. c. per minute) per second. During the reaction, the reactor was maintained at a temperature of about 285° C.

The gaseous reaction products were passed through the air-cooled condenser into the electrostatic precipitator which was operated at a potential of 15,000 volts (60 cycle A. C.). The phenyl carbamyl chloride separated from the gaseous reaction products by the precipitator was collected in the product receiver and the gaseous residue was discharged into the atmosphere through the outlet tube of the precipitator.

The phenyl carbamyl chloride was dissolved in toluene and the solution refluxed until the evolution of hydrogen chloride had ceased. The resulting solution was fractionally distilled and 55 grams of phenyl isocyanate was recovered. This represented a yield of 86% of theory, basis aniline.

The compounds which have been successfully prepared in good yields by the process of the present invention, their properties, and also the conditions used to produce these compounds are summarized in the following table.

| Amine | Molar Ratio COCl$_2$/Amine | Maximum Temp. in Reactor (°C.) | Condenser Temperature (°C.) | Carbamyl Chloride Boiling Range | Normal State | Yield percent Theory | Dehydrochlorination Agent | Solvent | Isocyanate Boiling Range | Yield percent Theory |
|---|---|---|---|---|---|---|---|---|---|---|
| Methyl | 1.2 | 270 | 49 | | | 99.6 | Pyridine | Toluene | | 82 |
| Do | 1.3 | 270 | 49 | | | 98.5 | do | do | | 85 |
| Do | 1.4 | 275 | 55 | | | 97.8 | do | do | | 87 |
| Do | 1.5 | 275 | 45–50 | | | | do | do | | 81 |
| Do | 2.0 | 280 | 48–52 | M. P. 43–46° C. | Solid | | do | do | 38° C. | 86 |
| Do | 2.5 | 275 | 45–50 | | | | do | do | | 89 |
| Do | 2.0 | 280 | 20–25 | | Liquid | | Dimethyl Aniline | None | 58–61° C. | 71 |
| Ethyl | 2.0 | 280 | 20–25 | | do | | do | do | 60–75° C. | 76 |
| Isopropyl | 2.0 | 280 | 20–25 | 98° C. with decomposition. | do | | do | do | 86–88° C. | 76.4 |
| N-propyl | 2.0 | 280 | 20–25 | 109–113° C. with decomposition. | do | | do | do | 113–116° C. | 70 |
| N-butyl | 2.0 | 280 | 20–25 | | do | | do | do | 100–103° C. | 78 |
| Iso-butyl | 2.0 | 245 | 20–25 | | do | | do | do | 99–101° C. | 70 |
| Sec-butyl | 2.0 | 245 | 20–25 | Decomposed at about 110° C. | do | | do | do | 129–140° C. | 45 |
| Mixed Amyl | 2.0 | 280 | 20–25 | | do | | do | do | 83–85°C | 75.4 |
| Allyl | 2.0 | 250 | 20–25 | Decomposition started at about 50° C. | do | | Heat | Benzene | 200–204°C. | 77 |
| N-octyl | 2.0 | 280 | 20–25 | 265–280°C. with decomposition. | do | | do | Toluene | 130–140°C. at 4 mm. | 57.5 |
| Dodecyl | 2.0 | 300–310 | 20–25 | M. P. 65–67°C. | Solid | | do | Benzene | 165–168°C. | 87.50 |
| Cyclohexyl | 2.0 | 280 | 20–25 | M. P. 56–59°C. | do | | do | Toluene | 158–162°C. | 86 |
| Phenyl | 2.0 | 280 | 60 | B. P. 245–247 | Liquid | 75 | | | | |
| Di-n-butyl | 2.0 | 275 | 25 | | | | | | | |

The foregoing examples have been restricted to a batch process for producing esters of isocyanic acid, but it will be apparent from the following description that the process may be carried out continuously.

In describing this embodiment of the invention, reference will be made to the accompanying drawing which illustrates the flow sheet of our continuous process.

The gaseous or vaporized amine is passed through flow meter 1 and pipe 3 into a tube reactor 5 of the type described above where it is intimately mixed and reacted with phosgene which is charged into the reactor, by way of flow meter 2 and pipe 4, at a rate calculated to supply from about 1.2 to about 2.5 moles of phosgene per mole of amine.

The gaseous reaction products leave reactor 5 by pipe 6 and pass through a heated hydrochloride trap 7 which is provided with an outlet pipe 8 for periodically discharging a small quantity of condensed amine hydrochloride, and also a second outlet pipe 9 through which the gaseous residue containing vaporized carbamyl chloride is conveyed to a hot condenser 10. This condenser is maintained at the desired temperature by means of warm water or other suitable media.

In condenser 10, a gaseous product including phosgene and hydrogen chloride and a liquid product containing the carbamyl chloride are separated from each other. The gaseous product leaves condenser 10 by means of a discharge pipe 11 and passes into a scrubbing system (not shown) where either or both of these gases are recovered or converted into non-corrosive and non-toxic compounds. The liquid product flows by way of pipe 12, liquid seal 13 and pipe 14 into reactor 15. The liquid seal prevents the gases separated in condenser 10 from passing with the liquid product into reactor 15 and at the same time prevents any gases developed in reactor 15 from flowing into condenser 10.

Reactor 15 consists of a glass lined jacketed vessel equipped with inlet tubes 16 and 17 for respectively charging a tertiary organic base and a solvent, the former being fed from a suitable source into reactor 15 by means of pipe 20, flow meter 18 and pipe 16, and the latter by means of pipe 21, flow meter 19 and pipe 17.

The tertiary organic base is continuously passed into reactor 15 at a rate which is determined by the rate at which the carbamyl chloride is formed and introduced into the reactor. In general, it is desirable to charge the reactor at such a rate as to supply from 1.25 to 2.0 moles of base for each mole of carbamyl chloride, but it is to be understood that the invention is not restricted thereto.

Since the dehydrochlorination reaction results in the continuous production of a tertiary organic base hydrochloride, some means must be provided for continuously removing part of this salt from the reactor in the form of a slurry in a portion of the reaction product. This is accomplished by means of a circulating system which includes pipe 22, pump 23, pipe 24, continuous filter 25, pipe 26, recycle flow meter 27 and pipe 28.

The tertiary organic base hydrochloride separated on filter 25 is fed by conduit 29 into a discharge hopper 30 from which it is conducted by conveyor 31 into a recovery system 32. At this point the tertiary base is liberated and purified by any suitable method and then stored for reuse in the process.

The solvent is charged into the reactor 15 at a rate calculated to maintain the volume and concentration of the reactants and reaction products substantially constant. This will, of course, depend upon the carbamyl chloride production rate, the isocyanate distillation rate, the rate at which the tertiary organic base hydrochloride is removed from the system and the rate at which the tertiary organic base is charged into reactor 15. However, once the process is in operation, the rate of addition of solvent is primarily determined by the efficiency of the system, i. e. it is added only in quantities which are necessary to make up for solvent losses.

As soon as the reaction products have reached a predetermined volume in reactor 15, distillation of the isocyanate product is initiated by passing steam or other heat exchanging media into the jacket surrounding the reactor. The resulting vapors including the isocyanate and a solvent are led by conduit 33 into a suitable fractionating column 34. The liquid product condensing in the fractionating column 34 returns by pipe 35 to reactor 15 and the overhead fraction passes by pipe 36 into a suitable condenser 37.

The condensed isocyanate product flows from condenser 37 by pipe 38 into split flow box 39 where it is divided into two streams, one of which is returned by pipe 40 as reflux to fractionating column 34. The second stream constituting the major proportion of the condensed product flows by means of pipe 41 into a suitable product receiver 42 which is provided with an outlet pipe 43 through which the isocyanate product may be continuously discharged into suitable storage vessels 44.

When non-gaseous amines are employed in the process represented by the accompanying flow sheet, they are first vaporized in a flash boiler (not shown) and then charged into tube reactor 5 through flow meter 1 and pipe 3.

When monosubstituted carbamyl chlorides are converted into the corresponding isocyanic acid esters by heating rather than by the use of a tertiary organic base, the flow sheet does not include pipe 20, flow meter 18 and pipe 16 or the system for handling the tertiary base hydrochloride.

The above description of the flow sheet has been directed primarily to a continuous process for producing esters of isocyanic acid, but the present invention is also applicable to the continuous production of mono- and disubstituted carbamyl chlorides. When so applied the accompanying flow sheet is much simplified as it then only includes flow meters 1 and 2, pipes 3 and 4, tube reactor 5, pipe 6, hydrochloride trap 7, pipes 8 and 9, condenser 10, pipes 11 and 12, liquid seal 13, pipe 14, receiver 15 and pipe 45 for discharging the carbamyl chlorides into storage vessels 46.

The various conditions of operation of the present process will now be discussed in detail.

In the production of carbamyl chlorides and isocyanic acid esters in accordance with the present invention, the gaseous or vaporized amine and phosgene are reacted together in a phosgene/amine molecular ratio which may vary from 1.2 to 2.5. Thus within this range very satisfactory results have been obtained by utilizing phosgene/amine ratios of 1.20, 1.25, 1.3, 1.4, 1.5, 1.67 and 2.5. Larger or smaller ratios are likewise within the scope of the invention, but when smaller ratios are employed, the theoretical requirements at least should be met.

In preparing monomethyl carbamyl chloride or the corresponding isocyanate it has been found that the best results are obtained when phosgene and methyl amine are reacted together in the proportion of about 1.4 moles of phosgene for each mole of methyl amine.

The temperature at which the amine-phosgene reaction is carried out may vary widely without departing from the spirit of the invention, but in general a reaction temperature of from 240° C. to 400° C., and preferably from 240° C. to 300° C., is employed.

Broadly stated, the amine-phosgene reaction may be carried out within the temperature range defined by the melting point of the corresponding amine hydrochloride and the temperature above which substantial decomposition of the carbamyl chloride into carbon and other undesired products takes place. It should be clearly understood, however, that the decomposition products of the monosubstituted carbamyl chlorides, hydrogen chloride and the corresponding isocyanates, are not included in the expression "undesired products", since they recombine upon condensation to reform the carbamyl chloride.

When reacting methyl amine with phospgene, the reactor is preferably operated in such a manner that the exist gases are maintained at a temperature of from 275° C. to 285° C., it being understood, of course, that this temperature will vary somewhat depending upon the size and construction of the reactor.

In the reaction between phosgene and other amines, the optimum reaction temperature will vary with each amine and in view of the numerous amines contemplated by the present invention, no attempt to set forth these temperatures will be made.

The optimum sojourn time of the reactants in the reactor varies with the amine being treated. In reacting phosgene with methyl amine the flow rate of these two gases is controlled so that the sojourn time falls within the range of from about 0.67 to about 1.4 seconds. Within this range a sojourn time of about 1 second is preferred since it results in the production of maximum product yields.

The carbamyl chloride condenser is maintained at a temperature substantially within the range of from 20° C. to 70° C. depending upon the product treated. In separating methyl carbamyl chloride, the condenser is preferably operated at a temperature of from 30° C. to 40° C. so that the liquid product flowing therefrom is maintained at about 64° C.

As indicated in Example V an electrostatic precipitator may be employed instead of or in combination with the conventional fluid cooled condenser. The potential at which the precipitator is operated varies with the carbamyl chloride being condensed and in view of the numerous compounds contemplated by the present invention no attempt has been made to set forth the operative conditions of the precipitator for each compound.

The manner in which the monosubstituted carbamyl chlorides are converted into the corresponding isocyanates is dependent upon the relationship between the boiling point of the isocyanate and the decomposition temperature of the carbamyl chloride. If the boiling point of the isocyanate is above the decomposition temperature of the monosubstituted carbamyl chloride, then the conversion may be carried out thermally without a dehydrochlorination agent. On the other hand if the boiling point of the isocyanate is below the decomposition temperature of the carbamyl chloride, then a dehydrochlorination agent is required. In either event, however, a dehydrochlorination agent may be employed.

When the conversion of the monosubstituted carbamyl chloride into the corresponding isocyanate is effected by means of a dehydrochlorination agent, we prefer to use a tertiary organic base such as pyridine, dimethyl aniline, etc. as these compounds produce no objectionable by-products. Calcium oxide is also suitable but is not as satisfactory as a tertiary base since the use of the former results in the formation of water which reduces the yield of the final product.

The optimum amount of dehydrochlorination agent for this reaction varies not only with the agent but also with the carbamyl chloride being treated. In general, the most satisfactory results are obtained by using a 25% to 100% molar excess of the dehydrochlorination agent. In preparing methyl isocyanate, pyridine is the preferred tertiary organic base and it is used preferably in an amount corresponding to a 25% molar excess, basis monomethyl carbamyl chloride.

An inert organic solvent is generally employed in the dehydrochlorination step since it serves to carry the isocyanate out of the tertiary base salt more smoothly, thus permitting a lower distillation temperature and enabling a better recovery. The solvent is preferably added to the reaction mixture in an amount which is substantially equal in volume to the amount of tertiary organic base employed, but it is to be understood that this is not critical as the solvent volume may be varied widely without materially affecting the product yield. In fact, it is within the scope of the present invention to omit a solvent altogether.

Toluene, benzene, xylene, kerosene, cyclohexane, carbon tetrachloride, hexahydrobenzene, ligroin, petroleum ether, etc. or mixtures thereof are examples of suitable inert organic solvents, but others may also be used.

The temperature at which the isocyanate is removed from the reaction mixture by distillation varies with the boiling point of the product and also the amount and type of inert organic solvent used. Moreover, the distillation temperature is also influenced by the dehydrochlorination agent if such a compound is employed in converting the monosubstituted carbamyl chlorides into the corresponding isocyanates.

The amines suitable for use as raw materials in the practice of the present invention comprise a wide variety of primary and secondary amines, having either cyclic or acyclic structure. These amines may be aromatic, aliphatic, alicyclic or heterocyclic or may contain mixed radicals of the above types, the only limitation being that they must not substantially decompose or polymerize when vaporized.

When reacting phosgene and amines in accordance with the present invention, a relatively small amount of the amine hydrochloride condenses in the reactor so that although the reactants are mixed and reacted while in the vapor phase, the reaction products are not completely in the vapor phase throughout the reaction. It is, however, within the scope of the present invention to react these materials at temperatures of such magnitude that all of the reaction products are maintained in the vapor phase throughout the reaction.

The above description and examples are intended to be illustrative only. Any modification or variation therefrom which conforms to the

What we claim is:

1. The process of producing carbamyl chlorides, which comprises reacting together, in the vapor phase, phosgene and a compound selected from the group consisting of primary and secondary amines, said reactants being employed in a phosgene/amine molecular ratio of at least 1 to 1 and said reaction being carried out at a temperature avoiding substantial decomposition of the carbamyl chloride into products which will not recombine to form carbamyl chloride.

2. The process of producing carbamyl chlorides, which comprises reacting together, in the vapor phase and at a temperature substantially in the range of from 240° C. to 400° C., phosgene and a compound selected from the group consisting of primary and secondary amines, said reactants being employed in a phosgene/amine molecular ratio of at least 1 to 1.

3. The process of producing carbamyl chlorides, which comprises reacting together, in the vapor phase, phosgene and a compound selected from the group consisting of primary and secondary amines, said reactants being employed in a phosgene/amine molecular ratio of at least 1 to 1 and said reaction being carried out at a temperature above the melting point of the corresponding amine hydrochloride but below that temperature at which substantial decomposition of the carbamyl chloride into products which will not recombine to form carbamyl chloride occurs.

4. The process of producing aliphatic carbamyl chlorides, which comprises reacting together, in the vapor phase, phosgene and a compound selected from the group consisting of aliphatic primary and secondary amines, said reactants being employed in a phosgene/amine molecular ratio of at least 1 to 1 and said reaction being carried out at a temperature avoiding substantial decomposition of the carbamyl chloride into products which will not recombine to form carbamyl chloride.

5. The process defined in claim 4 wherein phosgene and methyl amine are reacted together.

6. The process defined in claim 4 wherein phosgene and allyl amine are reacted together.

7. The process of producing monomethyl carbamyl chloride, which comprises reacting together, in the vapor phase, and at a temperature of about 285° C., phosgene and methyl amine, said reactants being employed in a phosgene/amine molecular ratio of at least 1 to 1.

8. The process of producing monomethyl carbamyl chloride, which comprises reacting together in the vapor phase, phosgene and methyl amine, said reactants being employed in a phosgene/amine molecular ratio of about 1.4:1 and said reaction being carried out at a temperature above the melting point of methyl amine hydrochloride but below that temperature at which substantial decomposition of the carbamyl chloride into products which will not recombine to form carbamyl chloride occurs.

9. The process of producing monomethyl carbamyl chloride, which comprises reacting together, in the vapor phase, phosgene and methyl amine, said reactants being employed in a phosgene/amine molecular ratio of from 1.2:1 to 2.5:1 and said reaction being carried out at a temperature avoiding substantial decomposition of the carbamyl chloride into products which will not recombine to form carbamyl chloride.

10. The process of producing carbamyl chlorides, which comprises reacting together, in the vapor phase, phosgene and a compound selected from the group consisting of primary and secondary amines and then recovering the resulting carbamyl chloride from the reaction product by condensation, said reactants being employed in a phosgene/amine molecular ratio of from 1.2:1 to 2.5:1 and said reaction being carried out at a temperature avoiding substantial decomposition of the carbamyl chloride into products which will not recombine to form carbamyl chloride.

11. The process of producing monomethyl carbamyl chloride which comprises supplying in the vapor phase phosgene and methyl amine to a reaction zone in the molecular proportions of from 1.2 to 2.5 moles of phosgene per mole of methyl amine and at such a rate that the sojourn time of said reactants falls within the range of about 0.67 to 1.4 seconds and then separating the resulting monomethyl carbamyl chloride from the reaction product by condensation, said reaction zone being maintained at a temperature avoiding substantial decomposition of the carbamyl chloride into products which will not recombine to form carbamyl chloride.

12. The process defined in claim 11 wherein the reaction zone is maintained at a temperature of from about 240° C. to about 400° C.

13. The process defined in claim 12 wherein the phosgene and amine are supplied to the reaction zone in the molecular proportion of 1.25 moles of phosgene per mole of methyl amine and at a rate such that the sojourn time of said reactants in said zone is approximately 1 second.

14. The process of producing allyl carbamyl chloride, which comprises reacting together, in the vapor phase, phosgene and allyl amine in the molecular proportions of from 1.2 to 2.5 moles of phosgene per mole of allyl amine and then recovering the resulting allyl carbamyl chloride by condensation, said reaction being carried out at a temperature avoiding substantial decomposition of the carbamyl chloride into products which will not recombine to form carbamyl chloride.

15. The process of producing a disubstituted carbamyl chloride, which comprises reacting together, in the vapor phase, phosgene and a secondary amine, said reactants being employed in a phosgene/amine molecular ratio of at least 1 to 1 and said reaction being carried out at a temperature avoiding substantial decomposition of the carbamyl chloride into products which will not recombine to form carbamyl chloride.

16. The process of producing di-n-butyl carbamyl chloride, which comprises reacting together, in the vapor phase, and at a temperature of about 275° C., phosgene and di-n-butyl amine and then condensing the resulting carbamyl chloride from the gaseous reaction product by cooling same to a temperature of about 25° C., said reactants being employed in a phosgene/amine molecular ratio of about 2 to 1.

17. A continuous process of producing carbamyl chlorides, which comprises continuously reacting together, in the vapor phase, phosgene and a compound selected from the group consisting of primary and secondary amines and continuously recovering the resulting carbamyl chloride from the reaction product by condensation, said reactants being employed in a phosgene/amine molecular ratio of at least 1 to 1 and said reaction being carried out at a temperature avoiding substantial decomposition of the carbamyl chloride into products which will not recombine to form carbamyl chloride.

18. A continuous process of producing carbamyl chlorides, which comprises continuously reacting together, in the vapor phase, phosgene and a compound selected from the group consisting of primary and secondary amines and continuously recovering the resulting carbamyl chloride from the reaction product, said reactants being employed in a phosgene/amine molecular ratio of from 1:1 to 2.5:1 and said reaction being carried out at a temperature avoiding substantial decomposition of the carbamyl chloride into products which will not recombine to form carbamyl chloride.

ROBERT J. SLOCOMBE.
EDGAR E. HARDY.

REFERENCES CITED

The following references are of record in the file of this patent:

UNITED STATES PATENTS

| Number | Name | Date |
| --- | --- | --- |
| 2,319,057 | Hanford | May 11, 1943 |
| 2,326,501 | Siefken | Aug. 10, 1943 |
| 2,346,202 | Waltmann | Apr. 11, 1944 |
| 2,362,648 | Lichty | Nov. 14, 1944 |

OTHER REFERENCES

Gattermann, "Liebigs' Annalen," vol. 244, pp. 34–36 (1888).

"Handbook of Chemistry and Physics," Chemical Rubber Pub. Co., 16th ed. (1931), pp. 418–419.

Ser. No. 405,992, Rinke (A. P. C.), pub. Apr. 20, 1943.

Beilstein, "Handbuch der Org. Chem.," 4th ed., vol. IV, pp. 114–115.